United States Patent [19]
Roth et al.

[11] Patent Number: 5,393,018
[45] Date of Patent: Feb. 28, 1995

[54] UNFOLDING AND LOCKING JOINT FOR SPACE ELEMENTS

[75] Inventors: Martin Roth, Taufkirchen; Helmut Kiendl, München, both of Germany

[73] Assignee: Deutsche Aerospace AG, Germany

[21] Appl. No.: 149,830

[22] Filed: Nov. 10, 1993

[30] Foreign Application Priority Data

Nov. 10, 1992 [DE] Germany ............ 4237854

[51] Int. Cl.⁶ .................................. B64G 1/46
[52] U.S. Cl. ...................... 244/173; 16/325
[58] Field of Search .......... 244/159, 173, 158 R, 244/49; 16/324, 325; 52/70, 71, 108, 113, 114, 121, DIG. 4; 160/188, 193, 213, 206, 183

[56] References Cited

U.S. PATENT DOCUMENTS

| | | | |
|---|---|---|---|
| 3,187,373 | 6/1965 | Fisher | 16/324 |
| 3,643,292 | 2/1972 | Mayer | 16/325 |
| 4,880,188 | 11/1989 | Roth et al. | 244/173 |

FOREIGN PATENT DOCUMENTS

| | | | |
|---|---|---|---|
| 3418413 | 1/1986 | Germany | 244/173 |
| 0015000 | 1/1990 | Japan | 244/173 |

*Primary Examiner*—Galen L. Barefoot
*Attorney, Agent, or Firm*—Evenson, McKeown, Edwards & Lenahan

[57] ABSTRACT

A joint is provided for the unfolding and locking of space elements, such as solar generator panels. On one joint half, a detent lever is swivellably connected having a clamping nose as well as a finger as the guiding element. During the unfolding operation, the finger slides on a guiding contour of the other joint half. Shortly before the fully unfolded condition is reached, the finger engages in a depression, and the clamping nose runs up onto a cam and clamps down on the latter under the effect of the spring tension directed to the common axis of rotation. A movable stop element, e.g. universal ball joint, simultaneously presses against a stop surface so that both joint halves are braced with respect to one another. An arrangement of high stiffness which is as free from play as possible results.

9 Claims, 1 Drawing Sheet

UNFOLDING AND LOCKING JOINT FOR SPACE ELEMENTS

BACKGROUND AND SUMMARY OF THE INVENTION

The present invention relates to a joint for unfolding and locking space elements, and more particularly, two joint halves configured to be swivelled about a common axis and each connected with another one of two respective adjacent space elements, a detent lever configured as a locking element and swivellably disposed on one joint half and acted upon by an elastic force in a direction to the common axis, a guiding contour situated on the other joint half, spaced from the common axis and provided with a depression, and a guiding element resting on the guiding contour, in the folded as well as not completely unfolded condition of the joint, which guiding element is configured as a portion of the detent lever and which, in the unfolded condition, engages in the depression.

DE 32 15 434 C2 shows a joint where a locking mechanism is described for unfoldable satellite solar generators. The space elements to be unfolded and locked are represented there by the individual panels of the solar generator. A joint of that type comprises two joint halves which are each connected with one of two adjacent panels and which are arranged so that they can be swivelled about a common axis. On one joint half, a detent lever is swivellably disposed which is used as the locking element and is provided with a spring which acts between its end and the common axis and pulls the detent lever in the direction to the latter. On the other joint half, a guiding contour is situated which is guided about the common axis at a distance of a defined radius and is provided with a depression. A guiding element which is constructed as a portion of the detent lever, specifically a locking pin, rests in the folded condition of the joint against an outer portion of the guiding contour and slides on the latter during the unfolding operation. When the completely unfolded condition is reached, however, the guiding element finally engages in the depression constructed as a groove. Since the spring, which acts in the direction to the common axis, holds the locking pin in the groove, the locked condition is therefore achieved.

This known joint has play even in the unfolded and locked condition. Particularly in the case of a fairly large number of space elements, such as, solar generator panels, to be unfolded, this play will add up and therefore will have an unfavorable effect on the accuracy of attitude and the attitude control. This play is unacceptable on the long run.

It is, therefore, an object of the present invention to provide a joint which is completely without play after the unfolding and locking. This object has been achieved in accordance with the present invention by a joint having a cam with a first surface situated on the other joint half, a clamping nose configured as a portion of the detent lever and having a second surface, such that, after engaging of the guiding element in the depression and shortly before the reaching of the completely unfolded condition, the second surface slides onto the first surface and is there clamped, and a stop element which is movably disposed on one joint half so that, in the completely unfolded condition, the stop element is pressed onto a stop surface situated on the other joint half.

Although, DE 40 32 112 C2 shows a locking mechanism for unfoldable solar generators of satellites via which also a high freedom from play is to be achieved in the locked condition, this mechanism, at least in one important point, is based on a completely different fundamental construction from the present invention and also has important disadvantages. Thus, no swivellable detent lever is used there but a wedge which is acted upon by a spring tension, is equipped with a roller and rests against a guiding surface. During the unfolding operation, the roller is to roll off on the circular guiding contour which also exists there, until a plane section of the guiding contour is reached. The wedge is finally clamped in between the guiding surface and this plane section of the guiding contour. It is a disadvantage of this known construction that there is always the danger of a jamming of the roller and the wedge between the guiding surface and the circular guiding contour, specifically still during the actual unfolding operation. Although this can be avoided when all component parts are extremely carefully dimensioned, such a dimensioning is always threatened by unavoidable tolerances as well as unpredictable changes of the coefficients of friction which may occur under space conditions. This known concept therefore has certain operating risks which are avoided in the case of the present invention.

A significant advantage of the present invention consists of the fact that, at the end of the unfolding operation, the detent lever slides by its clamping nose onto the surface of the cam and clamps there in a tight manner, and simultaneously the stop element of one joint half is pressed against the stop surface of the other joint half so that, by way of the forces acting on these two contact surfaces, a bracing takes place of the two joint halves with respect to one another. Thus, the otherwise existing play is completely eliminated in the joint halves, in the joint bearing and in the lever bearing. As a result, the joint forms a rigid unit of high stiffness which is completely free from play.

BRIEF DESCRIPTION OF THE DRAWINGS

These and further objects, features and advantages of the present invention will become more readily apparent from the following detailed description thereof when taken in conjunction with the accompanying drawings wherein.

BRIEF DESCRIPTION OF THE DRAWINGS

Figure 3:
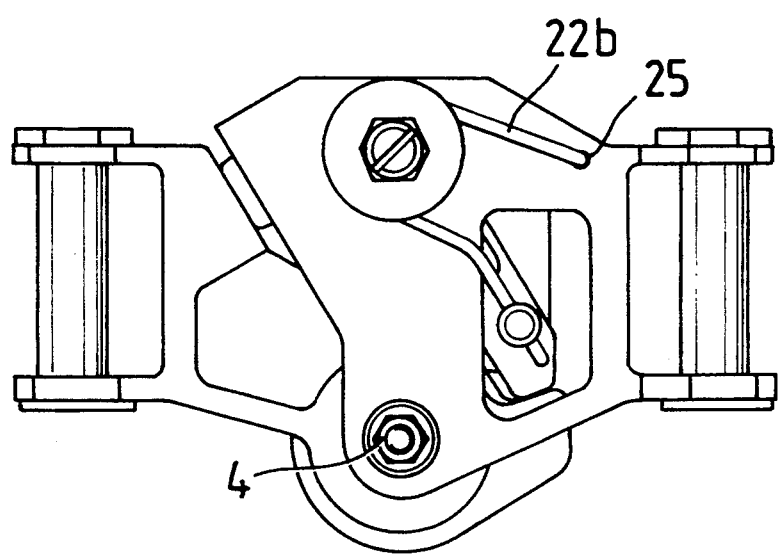
FIG. 3 is a plan view of the joint in the direction of arrow III in FIG. 2.

A joint 1 comprises one joint half 10 and another joint half 50 which are disposed by forks 11 and 51 on a common axle box 2 and can be swivelled about a common axis thereby. The two joint halves 10, 50 are held together by a screw 4 comprising a nut (FIG. 3). The forks 11, 51 are connected by centering pins 5 and screws 6 with two space elements (not shown), for example, solar panels.

In the first joint half 10, a block 12 is situated which can be swivelled about an axis 3, is shaped on top as part of a cylindrical surface 12a, and rests by means of that surface 12a on an identically shaped opposite surface 13 of this joint half 10. A swivellable detent lever 14 and a stop element in a form of a movable universal ball joint 20 are disposed in the block 12. For the fastening or clamping of the block 12, a nut 16 and a threaded bush 21 (FIG. 2) are used. Clamping via the nut 16 takes place by the collar surface 15a of a bearing pin 15; clamping via the threaded bush 21 takes place by the shoulder 26a of a bush 26.

Figure 2:
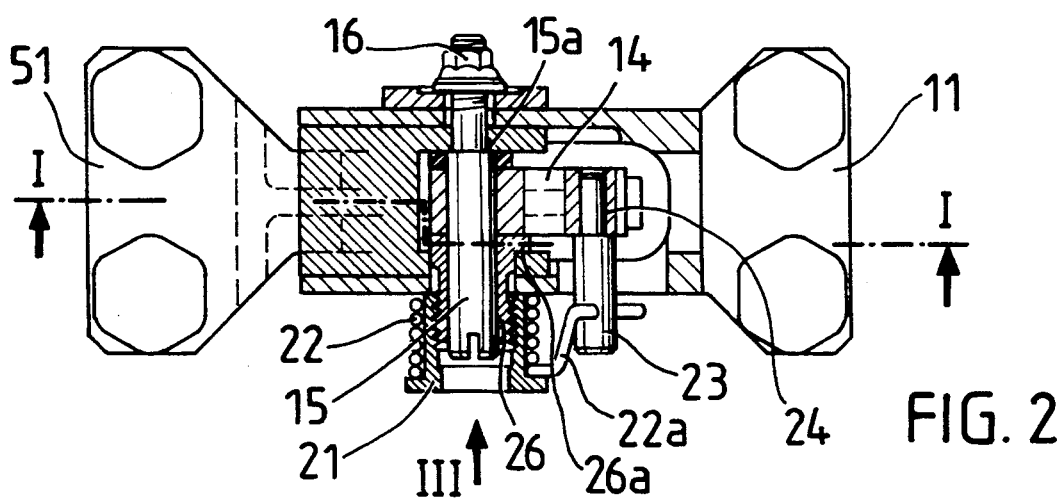
FIG. 2 is a schematic sectional view along line II—II of FIG. 1 of the joint corresponding to FIG. 1.

The threaded bush 21 is, at the same time, used as a bearing for a spring 22 which exerts an elastic force on the detent lever 14 directed to the common axis 3 and thus causes the locking of the detent lever 14 as well as finally the bracing of the two joint halves 10, 50 with respect to one another. For this purpose, a bent end 22a of the spring 22 is pushed through a pin 23 which is inserted into a bore 24 of the detent lever 14 (FIG. 2). The other end 22b of the spring 22 is fitted into a bore 25 on one joint half 10 (FIG. 3).

At its lower end, the detent lever 14 has a clamping nose 8 with a surface 17 and laterally a guiding element 20 constructed as a finger 18. The other joint half 50 has a guiding contour 53 on which the finger 18 of the detent lever 14 slides during the unfolding and until shortly before the end of the unfolding operation. The detent lever 14 is lifted so far that it moves over a cam 54 situated on the other joint half 50. Shortly before the end of the unfolding operation, the finger 18 engages in a depression 55 situated in the guiding contour 53. The clamping nose 8 of the detent lever 14 slides with its surface 17 onto a surface 56 situated on the cam so that the detent lever 14 clamps onto the surface 56 of the cam 54 under the bias of the spring 22. As a result, the joint halves 10, 50 are braced with respect to one another, and possible bearing plays in the bearing bush 2 or in the bearing of the detent lever 14 are eliminated. A stop element, specifically a universal ball joint 20, participates in the bracing, is movably disposed on one joint half 10 and is pressed against a stop surface situated on the other joint half 50. The universal ball joint 20 is movably disposed by a collar screw 19 so that it can be adapted to the slope of the stop surface 52.

The pressure of the universal ball joint 20 against the stop surface 52 also eliminates the play of the universal ball joint in the block 12 which initially exists. The precise adjustment of the detent function or the engaging depth of the detent lever 14 and the elimination of manufacturing tolerances can be caused by the removal of material on the universal ball joint 20 and by the selection of its correct thickness. The adjustment of the angular position of the unfolded and locked joint may be carried out by the rotation of the block 12 and the clamping together with the nut 16 and the threaded bush 21.

The surface 56 of the cam 54 may be constructed to be plane. Expediently, the surface 17 of the clamping nose 8 of the detent lever 14 must than be constructed to be slightly convex, so that a radius of curvature that is as large as possible is obtained. The surface 56 may also be constructed to be slightly concave, at least in a sectional plane which is oriented perpendicularly to the common axis 3, so that the plane 17 must then still be constructed to be convex, and its radius of curvature at the points which come in contact with the surface 56 must be selected to be slightly smaller than that of the surface 56. During the sliding of the clamping nose 8 onto the cam 54 under the effect of the spring 22 at the end of the unfolding operation, the contact point or the contact line between the surfaces 17 and 56 moves in the embodiment according to FIG. 1, to the right on surface 17, while the clamping nose 8 is pulled in toward the left and is clamped in there.

Figure 1:
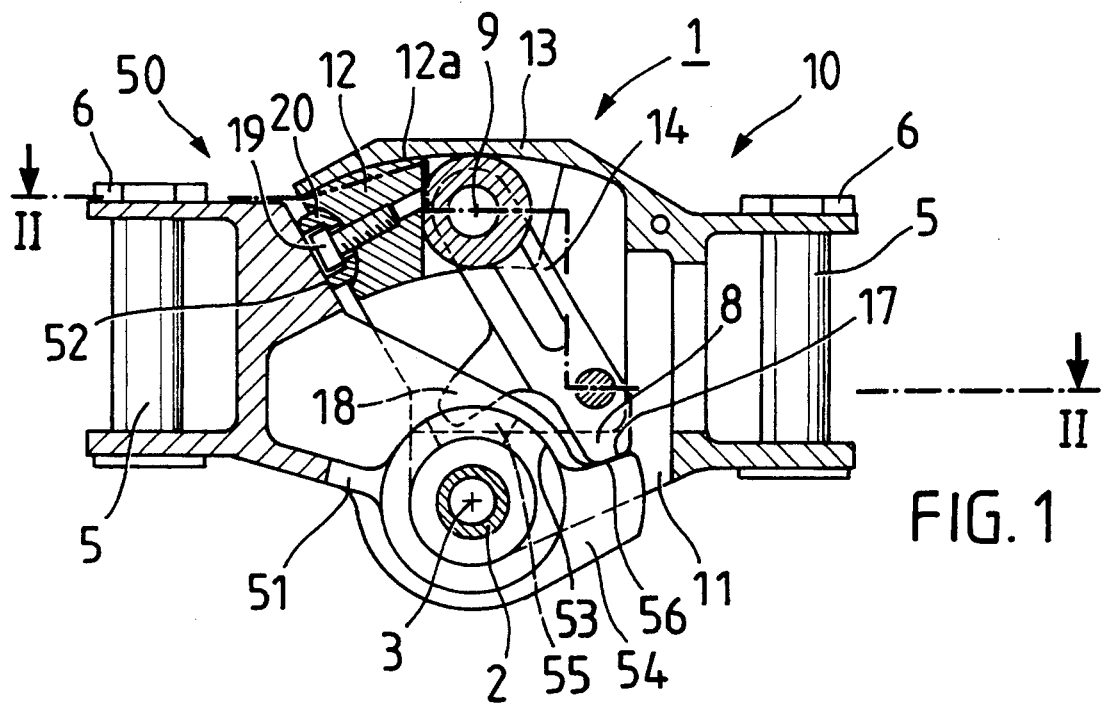
FIG. 1 is a sectional view along line I—I of FIG. 2 of a fully unfolded joint.

In the embodiment according to FIG. 1, the normal line on the contact point or the plane of the normal line on the contact line is always situated to the right of the swivel axis 9 of the detent lever 14. The straight connecting line or plane between the swivel axis 9 and the above-mentioned contact point or contact line in this case always forms an angle with the mentioned normal line or plane of the normal line, which must not become zero during the sliding-on or the clamping of the clamping nose 8. It is advantageous to keep this angle as small as possible. It is a condition for a self-locking, that is, a clamping of the clamping nose 8 on the surface 56, which is also not eliminated in the case of shocks, that the tangent of the mentioned angle must be smaller than the coefficient of friction of the surface 56.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A joint for unfolding and locking of space elements, comprising two joint halves configured to be swivelled about a common axis and connected with one of two respective adjacent space elements, a detent lever configured as a locking element and swivellably disposed on one joint half and acted upon by an elastic force in a direction to the common axis, a guiding contour situated on the other joint half, spaced from the common axis and provided with a depression, and a guiding element resting on the guiding contour, in the folded as well as not completely unfolded condition of the joint, which guiding element is configured as a portion of the detent lever and which, in the unfolded condition, engages in the depression, wherein a cam having a first surface is situated on the other joint half, a clamping nose configured as a portion of the detent lever and having a second surface is configured such that, after engaging of the guiding element in the depression and shortly before the reaching of the completely unfolded condition, the second surface slides onto the first surface and is there clamped, and a stop element is movably disposed on one joint half so that, in the completely unfolded condition, the stop element is pressed onto a stop surface situated on the other joint half.

2. The joint according to claim 1, wherein the first surface is plane, and the second surface is slightly convex with a large radius of curvature.

3. The joint according to claim 1, wherein the first surface is slightly concave, and the second surface is slightly convex with a smaller radius of curvature than the first surface.

4. The joint according to claim 2, wherein the radii of curvature of at least one of the second and first surfaces are locally variable.

5. The joint according to claim 3, wherein the radii of curvature of at least one of the second and first surfaces are locally variable.

6. The joint according to claim 1, wherein the stop element is a universal ball joint.

7. The joint according to claim 6, wherein the first surface is plane, and the second surface is slightly convex with a large radius of curvature.

8. The joint according to claim 7, wherein the radii of curvature of at least one of the second and first surfaces are locally variable.

9. The joint according to claim 6, wherein the first surface is slightly concave, and the second surface is slightly convex with a smaller radius of curvature than the first surface.

* * * * *